Oct. 28, 1924.
J. KRONDAK
1,513,607
DRAFT EVENER
Filed May 23, 1922
2 Sheets-Sheet 1
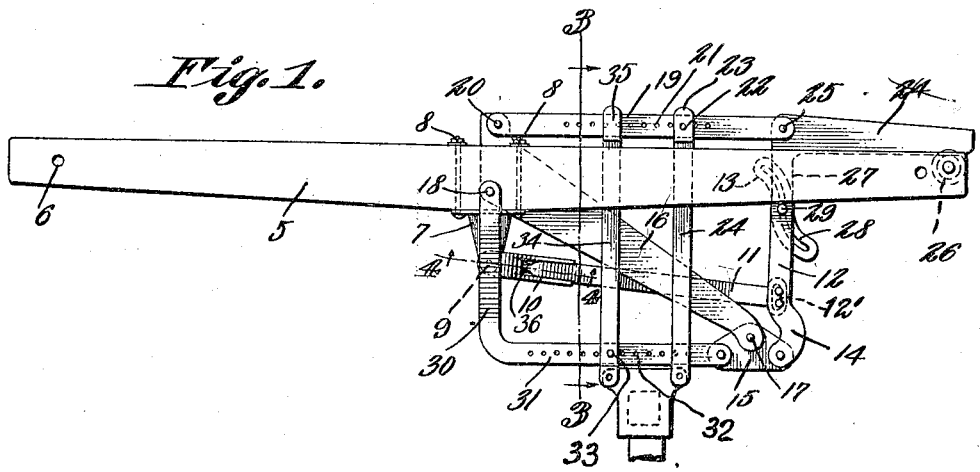
Fig. 1.
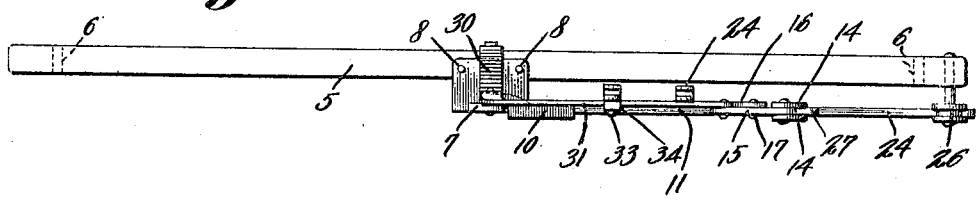
Fig. 2.
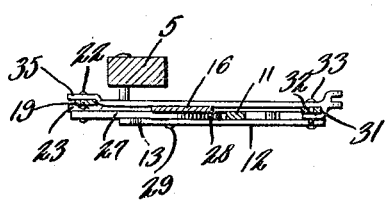
Fig. 3.
Fig. 4.
J. Krondak,
Inventor.
By C. A. Snow & Co.
Attorneys.

Oct. 28, 1924.                                                    1,513,607
                        J. KRONDAK
                        DRAFT EVENER
              Filed May 23, 1922        2 Sheets-Sheet 2

J. Krondak,
Inventor,

By
Attorneys.

Patented Oct. 28, 1924.

1,513,607

UNITED STATES PATENT OFFICE.

JAMES KRONDAK, OF MORSE BLUFFS, NEBRASKA.

DRAFT EVENER.

Application filed May 23, 1922. Serial No. 563,038.

*To all whom it may concern:*

Be it known that I, JAMES KRONDAK, a citizen of the United States, residing at Morse Bluffs, in the county of Saunders and State of Nebraska, have invented a new and useful Draft Evener, of which the following is a specification.

This invention relates to draft equalizers, and aims to provide novel means for equalizing the pull directed to a plow or similar farm machine, whereby two or more horses may be worked abreast and the machine moved thereby held in a true line, while in operation.

An object of the invention is to provide a device of this character which may be readily and easily applied to a draft beam of a vehicle or machine, and one wherein the arms and levers will be exceedingly sensitive to the draft of the animals hitched thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a draft equalizer constructed in accordance with the present invention.

Figure 2 is an elevational view thereof.

Figure 3 is a sectional view taken on line 3—3 of Figure 1.

Figure 4 is a sectional view taken on line 4—4 of Figure 1.

Figure 5:
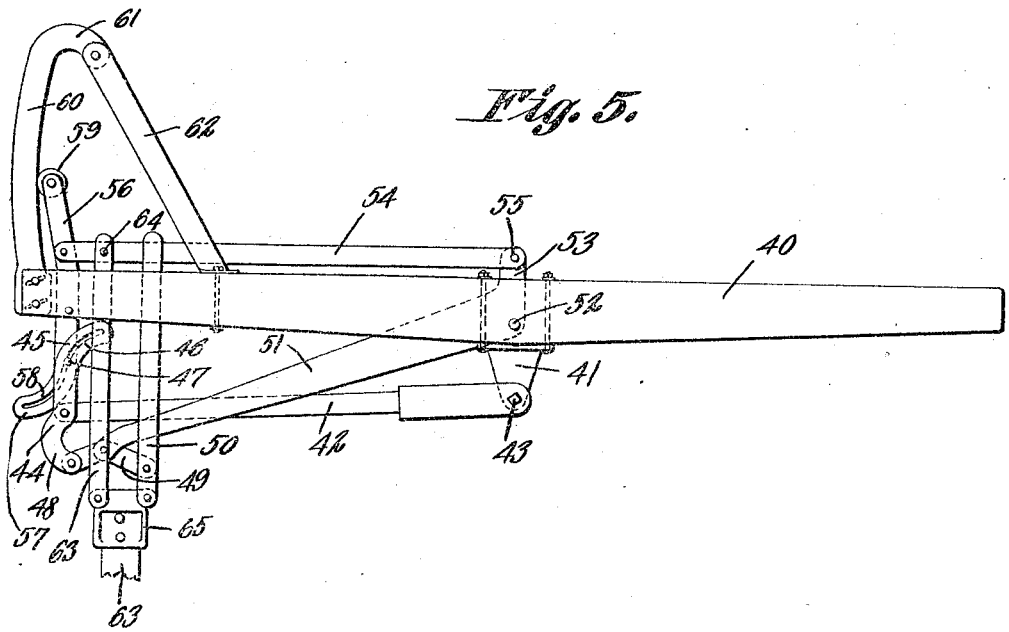
Figure 5 is a modified form of an evener.

Referring to the drawings in detail, the reference character 5 designates the main or draft bar of a vehicle or machine, the same being formed with openings 6 disposed at the ends thereof, which openings receive the usual connecting means employed between the main draft bar and whiffletrees. Secured to the draft bar 5 at a point intermediate its ends, is a rearwardly extending bracket member 7 which is bolted to the draft bar 5 as by means of the bolts 8. The bracket member embodies an arm formed with an opening at its outer ends, adapted to accommodate the pivot bolt 9 providing the connection between the bracket 7 and head 10 of the bar 11.

This bar 11 extends at an angle with respect to the bar 5 and has its opposite end secured to the bar 12 which has a curved extremity 13 lying directly under the bar 5 and formed with an elongated opening. The lower extremity of the arm 12 is curved as at 14, where the same has pivotal connection with the plate 15, that in turn has pivotal connection with the bar 16 as at 17. The bar 16 has one end thereof pivotally connected to the draft bar 5 as at 18, one portion of the bar extending beyond the front surface of the bar 5 where the same has connection with the connecting bar 19 as at 20.

Formed in the arch bar 19 are a plurality of spaced openings 21 that accommodate the bolt 22 carried by the offset portion 23 of the pull bar 24. One end of the arch bar 19 is pivotally connected to the angle bar 24 by means of the bolt 25, one section of the bar 24 lying in proximity to the rear edge of the bar 5 where the same engages with the pulley 26. One section of the bar 24 extends forwardly and laterally as at 27, the same being formed with an elongated opening 28 to accommodate the pin 29 which also moves in the slotted portion of the curved extremity 13 of the bar 12. Thus it will be seen that as one bar moves, the pin rides in the slot of the adjacent bar, moving the adjacent bar with respect thereto.

Pivotally secured to the draft bar 5 at a point substantially intermediate its ends, is a bar 30 which has a right angled portion 31 formed with openings 32 for the reception of the pin 33 carried by the pull bar 34. In view of the foregoing it is obvious that the pull bar 34, which is formed with a head 35 at one end thereof to accommodate the arch bar 19, may be adjusted with respect to the right angled portion 31, as well as the arch bar 19.

One end of the bar 11 is threaded as at 36 and accommodates the nut 37 for securing the bar 11 to the head 10.

In the form of the invention as shown by Figure 5 of the drawings, the draft bar 40 is provided with a bracket member 41 disposed intermediate its ends, to which bracket member is secured the bar 42 as by means of the pivot bolt 43.

The opposite end of this bar 43 has pivotal connection with the bar 44 which has an upper curved extremity 45 formed with an opening 46 to accommodate the pin 47. The forward extremity of the bar 44 is curved as at 48 where the same has pivotal connection with the angle bar 49 that in turn has pivotal connection with the draft bar 50.

Pivotally connected to the intermediate portion of the bar 49 is an angularly disposed bar 51 which has pivotal connection with the bar 40 as at 52, an extension forming a part thereof being indicated at 53. Extending parallel with the bar 40 is a bar 54 that is pivotally connected to the extension 53 as at 55, the opposite end being pivotally connected to the bar 56. This bar 56 is formed with a curved portion 57 formed with an elongated opening 58 which also accommodates the pin 47 that is loosely positioned therein so that movement of the bar 56 results in a relative movement of the bar 44.

Positioned in the outer end of the bar 56 is a roller 59 which normally engages one surface of the bar 60 which is secured to the extreme end of the bar 40, the upper end thereof being curved as at 61 to connect with the bar 62 that is bolted to the draft bar 40.

Associated with the bar 50 is a bar 63 which is bolted to the bar 54 as at 64, the forward end thereof having connection with the head 65 that connects with the tongue 66.

From the foregoing it is obvious that the structure shown will direct the draft from the center of the bar 5 to the plow and beam supporting the same by means of a cross draft. The arm 11 accomplishes this cross draft through the bracket 7 and bar 12.

In the operation of the device, when a pull is exerted on the bar 5, the lower section of the bar 12 pulls on the plate 15, which being bolted to bar 16 creates an upward or straight pull on bar 31, which being secured to the draft bar at 18, causes a pull to be exerted on bar 34 which takes care a portion of the load, to equalize the pull.

Figure 6:
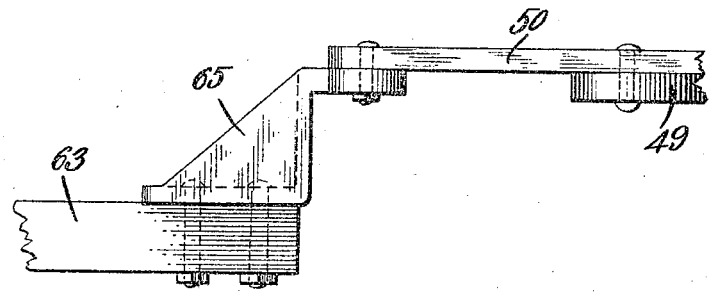
Figure 6 is a fragmental elevational view disclosing the connecting bracket between the draft bar and one of the arms of the equalizer.

A portion of the draft is accomplished through the upper half of bar 12, which by pulling on bolt 29 exerts a pull on the angle bar 24, which creates an upward pull on the arch bar 19 for pulling the bar 24. In the modified form of the invention as illustrated by Figures 5 and 6 of the drawings, it is the purpose of the invention to direct the lateral draft to the extreme end of the draft bar 40, which is accomplished by means of the bar 61 on which the roller 59 moves, the roller being carried by the bar 56.

The operation of the several bars and levers in this form of the invention is identical with the arms and levers as shown by the figures as illustrated by Sheet 1 of the drawings.

Having thus described the invention, what is claimed as new is:—

1. A draft evener comprising a draft bar, a bar having one end thereof connected to the draft bar at a point intermediate the ends of the draft bar and having a right angled end formed with a plurality of openings, a plate having connection with the right angled end of the bar, an angularly disposed bar having connection with the plate and having pivotal connection with the draft bar, an angle bar having connection with the plate for exerting a pressure on the angularly disposed bar, a connecting bar connecting the angularly disposed bar and angle bar, and pull bars having connection with the first mentioned bar and connecting bar.

2. A draft evener comprising a draft bar, a bar having connection with the draft bar and having a right angled extremity, a plate connected with the right angled extremity, an angularly disposed pivoted bar having connection with the bar at a point intermediate the ends of the draft bar, said angularly disposed bar having pivotal connection with the plate, a sectional bar having connection with the plate and extending in parallel relation with the first mentioned bar, a bar for connecting the angularly disposed bar and sectional bar, and pull bars connected with the last mentioned bar.

3. A draft evener comprising a draft bar, a pivoted bar supported adjacent to the central portion of the draft bar, and having a right angled extremity, a plate having connection with the right angled extremity, an angularly disposed bar having connection with the plate and having pivotal connection with the first mentioned bar, a sectional bar having connection with the plate, and extending in parallel relation with the first mentioned bar, a bracket member on the draft bar and disposed substantially intermediate its ends, an angularly disposed bar connecting the bracket and sectional bar, a connecting bar for connecting the first mentioned angularly disposed bar and sectional bar, and pull bars mounted on the connecting bar and having connection with the first mentioned bar.

4. A draft evener comprising a draft bar, a pivoted bar having a right angled extremity, a plate having connection with the right angled extremity of the pivoted bar, a connecting bar positioned on the opposite side of the draft bar, bars for adjustably connecting the right angled end of the pivoted bar and arch bar, an angular bar having connection with the plate and having pivotal connection with the pivoted bar, and means having connection with the plate and connecting bar for directing a pull on the angular bar.

In testimony that I claim the foregoing as my own, I have hereto affixed my signature in the presence of two witnesses.

JAMES KRONDAK.

Witnesses:
F. A. VOTRUBA,
J. J. VLASAK.